United States Patent
Harris

(10) Patent No.: US 6,317,093 B1
(45) Date of Patent: Nov. 13, 2001

(54) SATELLITE COMMUNICATION ANTENNA POINTING SYSTEM

(75) Inventor: Joel Harris, Northborough, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/635,937

(22) Filed: Aug. 10, 2000

(51) Int. Cl.[7] .................................................. H01Q 3/00
(52) U.S. Cl. .......................... 343/765; 343/766; 343/840; 343/882
(58) Field of Search ..................... 343/765, 766, 343/840, 781 CA, 781 P, 882

(56) References Cited

U.S. PATENT DOCUMENTS

| | | | |
|---|---|---|---|
| 5,089,824 | * | 2/1992 | Uematsu et al. ............... 342/359 |
| 5,517,204 | * | 5/1996 | Murakoshi et al. ............ 343/765 |
| 5,708,679 | | 1/1998 | Fernandes et al. .............. 375/200 |
| 6,043,788 | * | 3/2000 | Seavey ........................ 343/781 CA |

* cited by examiner

Primary Examiner—Tan Ho
(74) Attorney, Agent, or Firm—Daly, Crowley & Mofford, LLP

(57) ABSTRACT

An antenna pointing system automatically aligns an antenna with a geo-synchronous satellite using a Ku band signal, which has a relatively broad bandwidth, with sufficient accuracy for Ka band signal transmission, which has a relatively narrow bandwidth. Initially, the antenna is pointed at the selected satellite so as to receive the Ku band signal. The system obtains a series of signal strength readings over a predetermined azimuth (or elevation) region, such as plus/minus two degrees, from which a new peak location is selected. Signal strength data is then obtained over a predetermined elevation (or azimuth) region. Another signal peak location is selected based on the elevation data. Azimuth and elevation data are alternately collected for refining the peak of the Ku signal so as to optimize Ka signal transmission capability.

18 Claims, 11 Drawing Sheets

SATELLITE COMMUNICATION ANTENNA POINTING SYSTEM

FIELD OF THE INVENTION

The present invention relates generally to communication systems, and more particularly, to satellite communication antenna systems.

BACKGROUND OF THE INVENTION

A satellite communication system generally includes an antenna that must be aligned with a geo-synchronous satellite. One such system, known as a Ku/Ka band system, generally transmits at the Ka band and receives at the Ku band. Typically, the antenna is coarsely pointed at the selected satellite after which an installation technician manually adjusts the antenna position by determining the peak Ku band signal by moving the antenna in azimuth and elevation. However, when the antenna is aligned with the satellite using the Ku band signal, the antenna may not be aligned with sufficient accuracy to achieve optimal Ka band transmission performance. This misalignment with the satellite can occur since the Ku bandwidth is much broader than the Ka bandwidth. In addition, changing atmospheric conditions can further impair a marginal alignment.

Typically, after aligning the antenna using the Ku band signal, the technician must contact a remote station to request an evaluation of the antenna's Ka band transmission characteristics. The alignment process continues in this way until the Ka band transmission is optimized to the extent possible using such a manual process. It will be appreciated that the foregoing is a time-consuming and expensive process.

It would, therefore, be desirable to provide a Ku/Ka band satellite communication system that automatically aligns an antenna with a geo-synchronous satellite with sufficient accuracy for optimal Ku band and Ka band performance.

SUMMARY OF THE INVENTION

The present invention provides an automated antenna alignment system that positions an antenna based upon a first signal with sufficient accuracy so as to optimize transmission of a second signal having a frequency higher than that of the first signal. This arrangement eliminates the need for a technician to manually position the antenna during the installation process. While the invention is primarily shown and described in conjunction with a dual reflector Ku/Ka band satellite communication antenna, it is understood that the antenna pointing system is applicable to a variety of antenna types having a range of sizes and transmit/receive frequencies.

In one embodiment, a Ku/Ka band satellite communication system includes an automated antenna alignment system that automatically aligns the antenna with a geo-synchronous satellite. The communication system includes a feed horn, as such term is understood in the art, aligned with the antenna, which can include a subreflector and a main reflector. A housing is coupled to a rear of the main antenna for containing azimuth and elevation drive assemblies. A control unit is secured to the antenna for controlling the drive assemblies that mechanically position the antenna system in azimuth and elevation, and for providing the azimuth and elevational positions to the controller. The control unit can further include a power meter for detecting signal strength from the feed horn and providing the signal strength information to a controller where the signal strength is correlated to the azimuth and elevational positions of the antenna.

In operation, the antenna is initially positioned such that a first signal having a first frequency is received by the antenna system. The system then effects a force on the antenna such that it is moved across a predetermined azimuth region while signal strength data is collected by the power meter and stored with the various antenna positions in the controller. Based upon the collected data, a signal peak location is selected, and the antenna is then repositioned at the position where the signal peak occurred. Signal strength data is then collected across a predetermined elevation region and a new signal peak location is chosen based upon the elevation data. This process is repeated a desired number of times to achieve a selected accuracy level.

The signal peak location can be determined using an algorithm, such as least squares parabola, on the collected azimuth and elevation data. Thus, the antenna is positioned with sufficient accuracy from the first signal to provide optimal signal transmission of a second signal having a bandwidth that can be significantly narrower than that of the first signal. The automated and accurate positioning of the antenna obviates the need for manual trial and error positioning of the antenna by a technician.

These and other objects, aspects, features and advantages of the invention will become more apparent from the following drawings, detailed description and claims.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
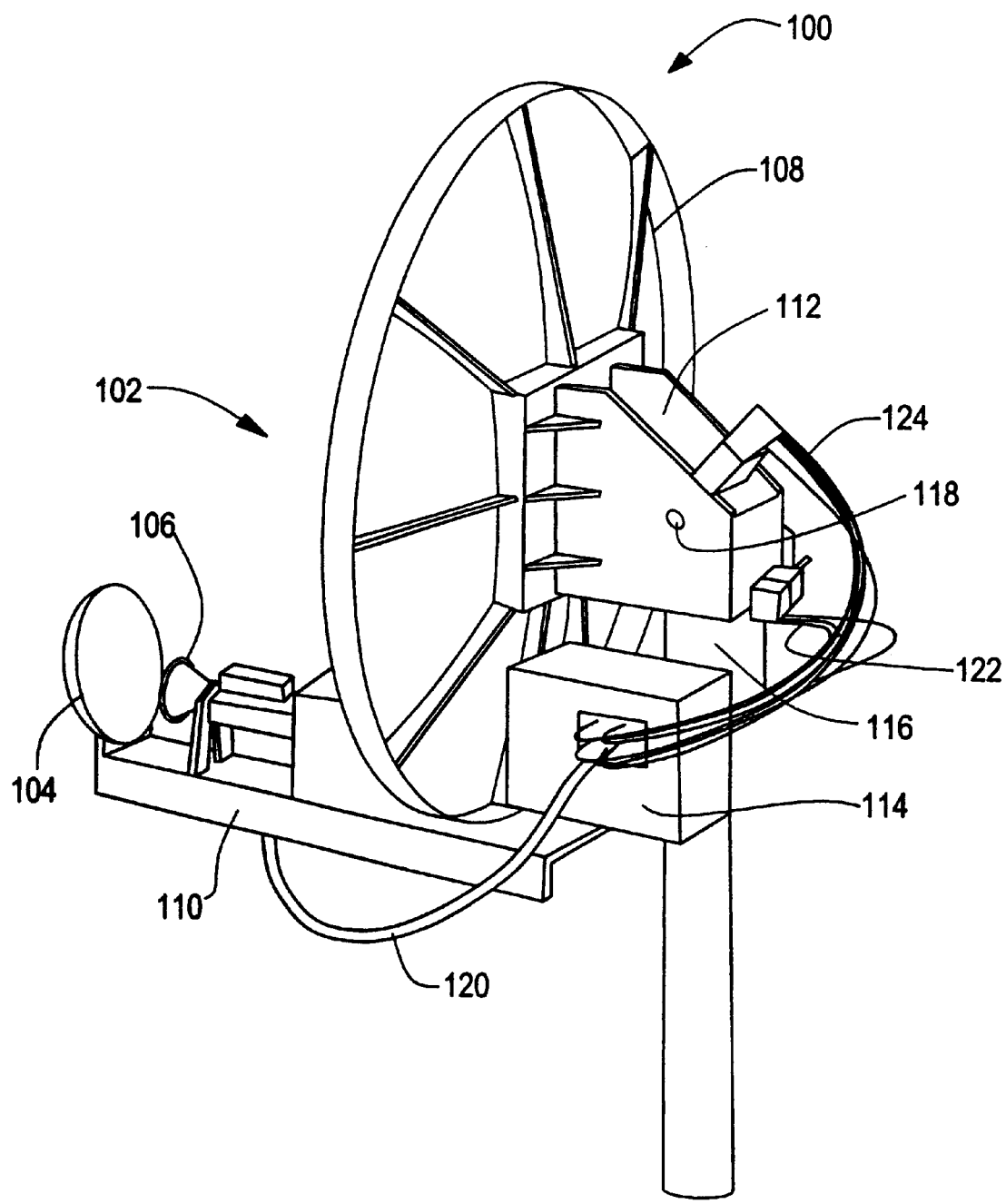
FIG. 1 is a perspective view of an antenna pointing system for automatically aligning a satellite communication antenna in accordance with the present invention.

FIG. 1 shows an antenna system 100 having an automated antenna pointing system in accordance with the present invention. The system includes an antenna 102 that can be provided as a dual reflector antenna having a subreflector 104 that reflects energy from a feed horn 106, as this term is understood in the art, to main reflector 108. In the embodiment shown, the subreflector 104 is offset from the main reflector 108. The main reflector 108 can have a parabolic shape and the subreflector 104 can have an elliptical shape, however it is to be appreciated that differing antenna systems can have reflectors of different shapes and configurations. The subreflector/feed assembly can be affixed to the antenna via a boom assembly 110.

The antenna system 100 includes a housing 112 affixed to a rear of the main antenna 108 and a control unit 114 secured to the boom assembly. As described in more detail below, the housing 112 can contain azimuth and elevation drive assemblies (see FIGS. 5–8) that are controlled by the control unit 114. The system 100 can pivot about an azimuth axis 116 and an elevation axis 118 as directed by the respective azimuth and elevation drive assemblies (see FIGS. 5–8). In the present embodiment, a data cable 120 connects the feed 106 to the control unit 114, which is coupled to the housing 112 via respective azimuth and elevation cables 122,124. It is to be appreciated that in another embodiment, the data cable 120 can be replaced by a remote transmitting means (not shown), and a receiver can be positioned in the control unit (not shown). As described in detail below, the antenna system is automatically positioned in azimuth and elevation for optimal receive and transmit performance.

Figure 2:
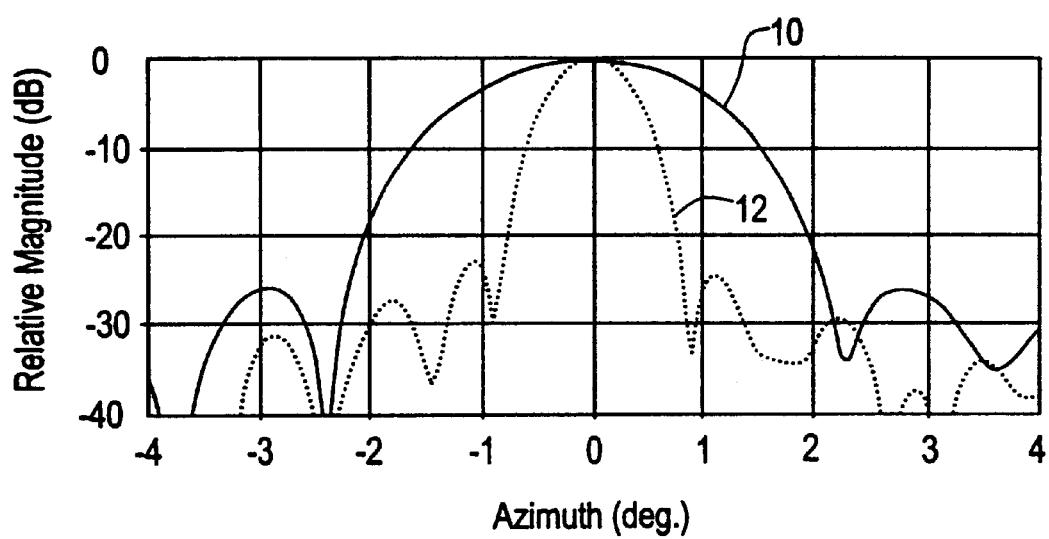
FIG. 2 is a graphical depiction of Ku and Ka band relative magnitude versus azimuth position.

In one embodiment, the antenna system 100 communicates with a geo-synchronous satellite by transmitting in the Ka band and receiving in the Ku band. FIG. 2 graphically shows an example of the Ku signal bandwidth 10 and the Ka signal bandwidth 12. As can be seen on the graph, a one degree offset from the signal peak, shown at 0 degrees, will not interfere with signal reception of the Ku signal 10. However, the same one degree offset prevents Ka band signal transmission to the satellite. Thus, the difficulties associated with aligning the antenna system with the received Ku band signal with sufficient accuracy for Ka band transmission are readily apparent.

As described below, the antenna system 100 automatically positions the antenna 102 using the relatively broad bandwidth Ku signal with sufficient accuracy for optimal Ka band transmission capability. It is understood, however, that the invention is applicable to a variety of bandwidths and communication systems in which the antenna 102 is aligned with a satellite using a first signal differing from a second signal that is transmitted by the antenna 102.

Figure 3:
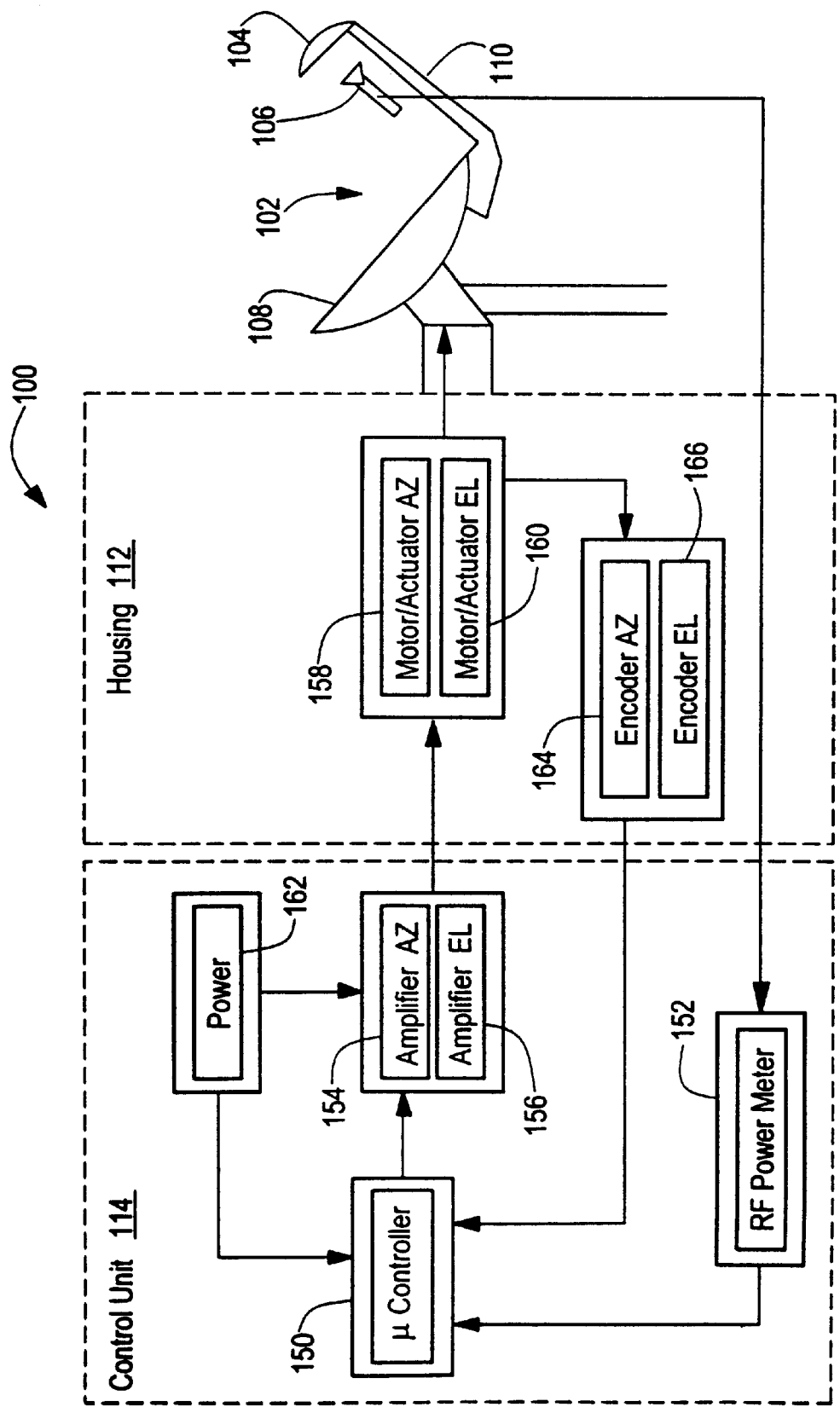
FIG. 3 is a block diagram of the antenna pointing system of FIG. 1.

FIG. 3 shows an exemplary embodiment of the control unit 114 and azimuth and elevation drive assemblies contained in the housing 112. The control unit 114 includes a microcontroller 150 that provides overall control of the system for positioning the antenna 102. The microcontroller 150 is coupled to an RF power meter 152, which can be provided as Analog Devices Logarithmic Detector having model number AD8313. The power meter 152 receives a signal from the antenna feed 106 and provides a signal strength indication to the controller 150, which correlates the signal information with the antenna position.

The control unit 114 further includes an azimuth amplifier 154 for receiving an antenna azimuth position signal and providing an azimuth movement signal to the azimuth antenna motor 158 in the housing 112. Similarly, the control unit 114 includes an elevation amplifier 156 for receiving an antenna elevation position signal and providing an elevation movement signal to the elevation motor 160. The azimuth and elevation amplifiers 154,156, can be energized by a power module 162 contained in the control unit. In one embodiment, the power module 162 includes a battery for powering the azimuth and elevation motors 156,160. The azimuth drive assembly can further include an azimuth encoder 164 for providing antenna azimuth position information to the controller 150. Similarly, the elevation drive assembly can include an elevation encoder 166 for providing elevation information. The controller 150 stores the azimuth position information and the elevation information in a data table with the signal strength obtained at each antenna location.

Figure 4:
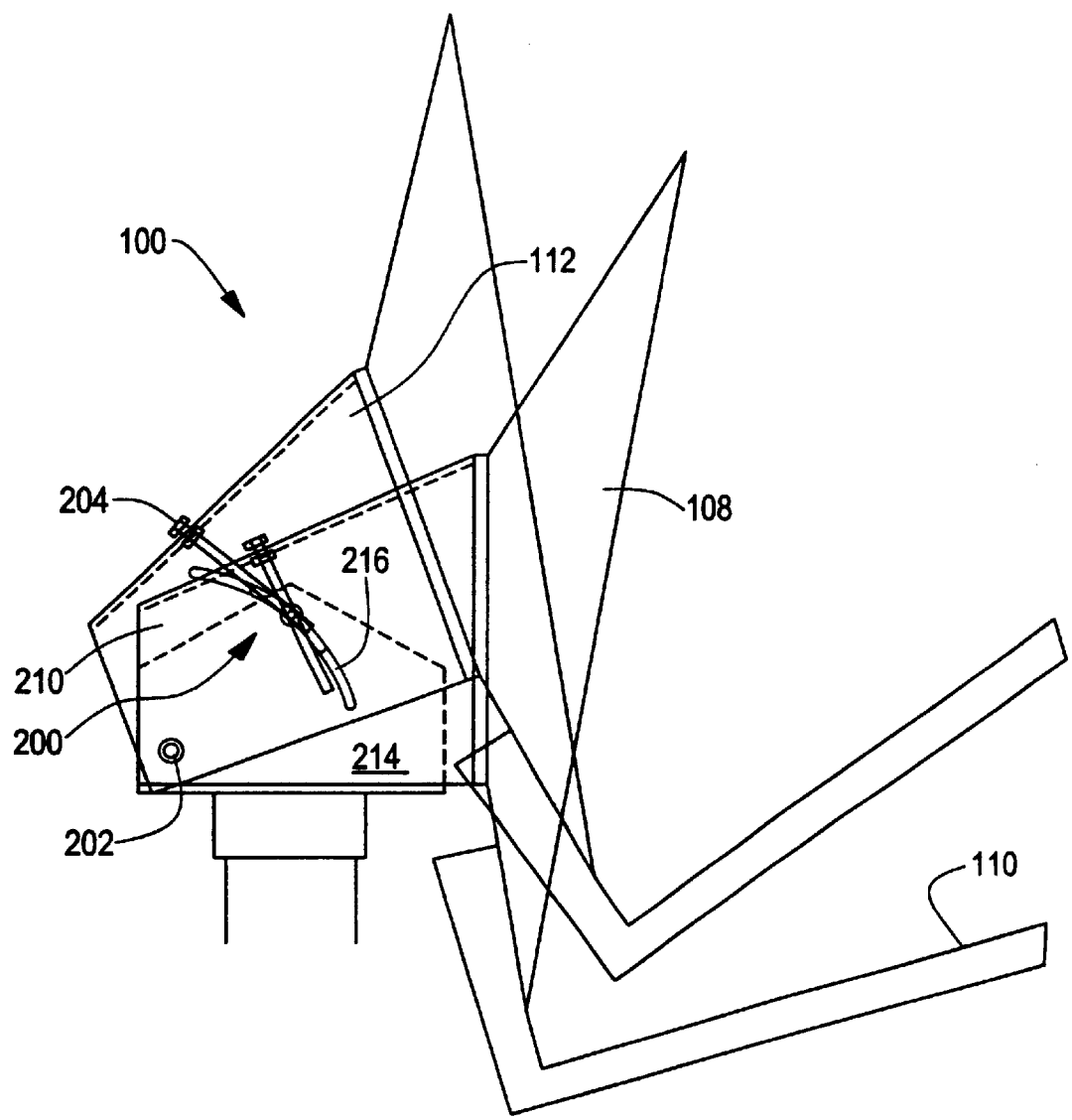
FIG. 4 is a schematic representation of an elevation mechanism that can form a part of the antenna pointing system of FIG. 1.
Figure 6:
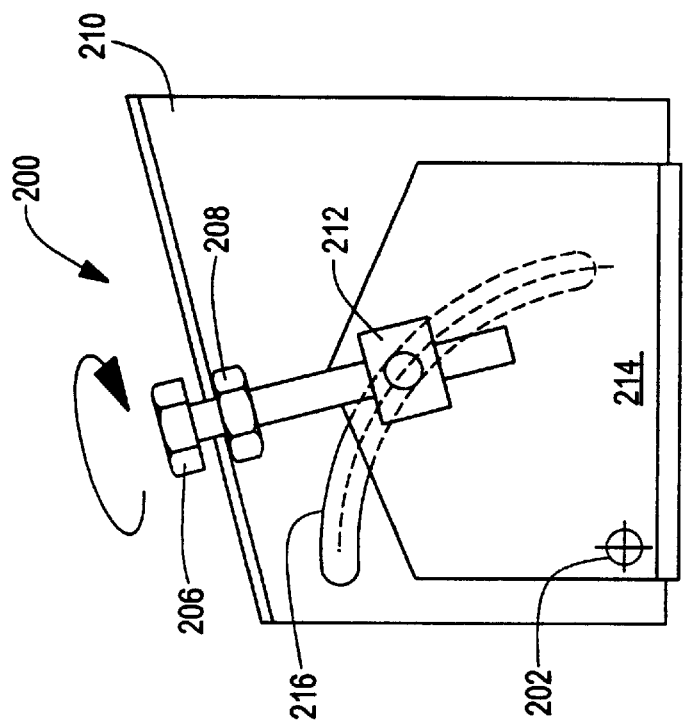
FIG. 6 is a schematic representation showing still further details of the elevation mechanism of FIG. 5.
Figure 5:
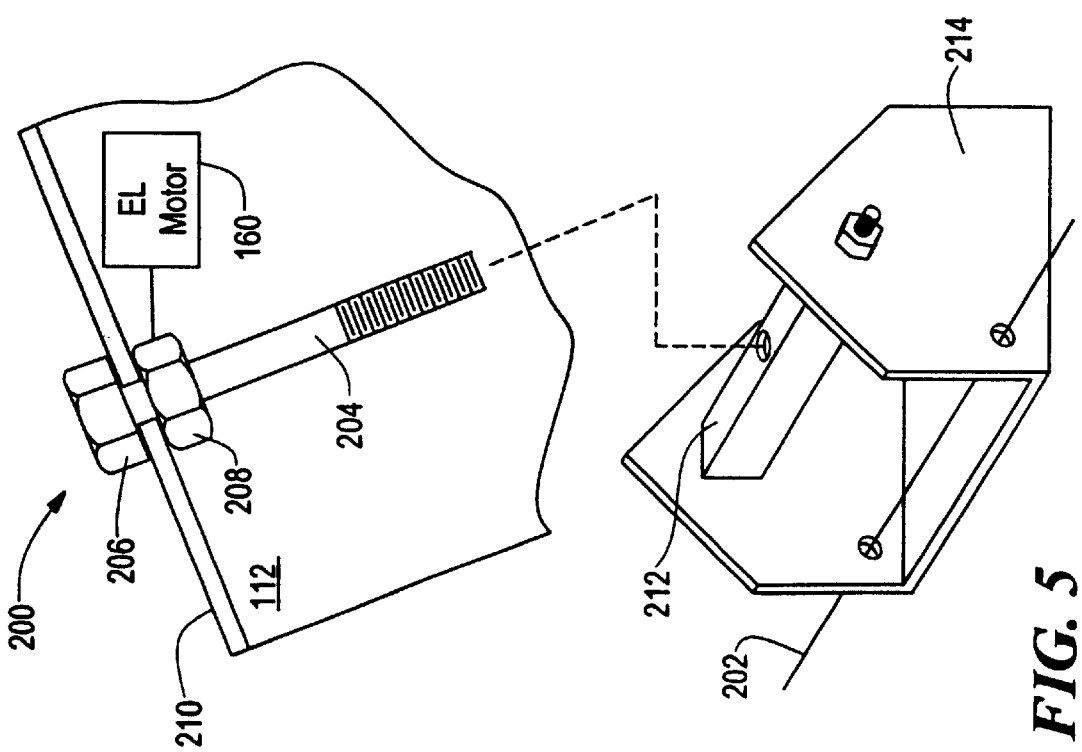
FIG. 5 is a schematic representation showing further details of the elevation mechanism of FIG. 5.

FIGS. 4–6, in combination with FIG. 3, show an exemplary embodiment of an antenna elevation positioning mechanism 200 that is controlled by the controller 150. FIG. 4 shows the antenna 102 in first and second positions. The elevation mechanism 200 controls the position of the antenna 108 in elevation. The elevation drive assembly, e.g., the elevation motor/actuator 160, manipulates the antenna 108 about an elevation axis 202. In one embodiment, the elevation mechanism 200 includes an elevation bolt 204 having first and second nuts 206,208 at a fixed spacing. An upper portion 210 of the housing 112 rests on the top of the second nut 208 due to gravity. The elevation bolt 204 is threadably engaged with a bar 212 that is pivotably secured to a lower portion 214 of the housing, which is fixed in position. An arcuate slot 216 is formed in a lateral portion of the upper housing portion 210.

To effect elevational antenna positioning, the controller 150 sends a signal to the elevation amplifier 156 that actuates the elevation motor 160 so as to rotate the elevational bolt 204. The bolt 204 is coupled to the motor 160 in a manner well known to one of ordinary skill in the art, such as to the second nut 208 so as to allow manual rotation of the first nut 206. The first and second nuts 206,208 can be affixed to the bolt 204. Rotation of the bolt 160 causes displacement with respect to the bar 212, to which it is threadably engaged. As the bolt 204 moves downward, gravity causes downward movement of the housing 210, which rests on the second nut 208. Upward movement of the bolt 204 pushes the second nut 208 upwards on the housing so as increase the elevational position of the antenna 108. It is to be appreciated that alternate lift mechanisms employing hydraulic or cantilever arms can be used to effect elevational movement of the antenna 108.

Figure 7:
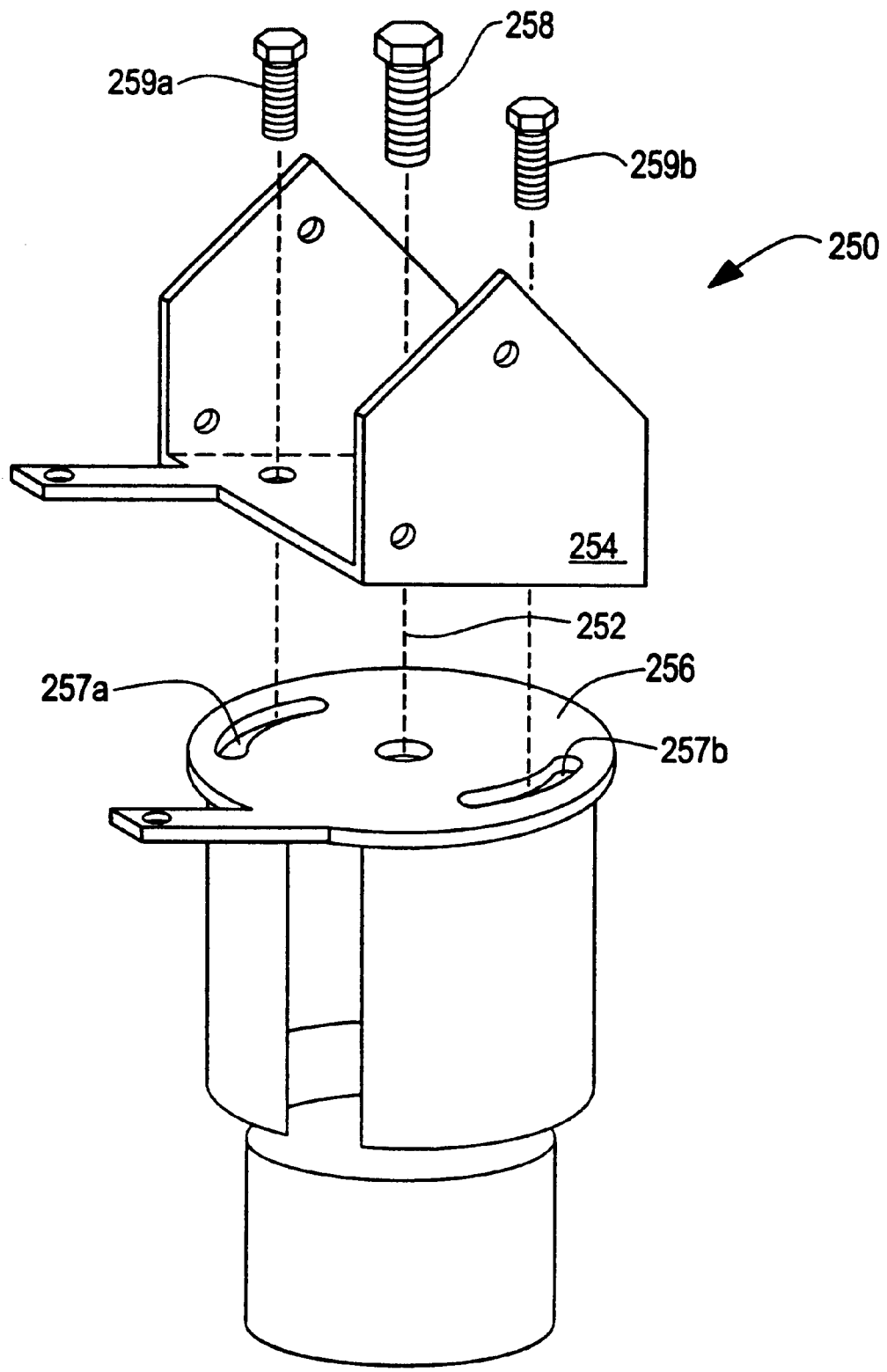
FIG. 7 is a schematic representation of an azimuth mechanism that can form a part of the antenna pointing system of FIG. 1, which is shown in first and second positions.
Figure 8:
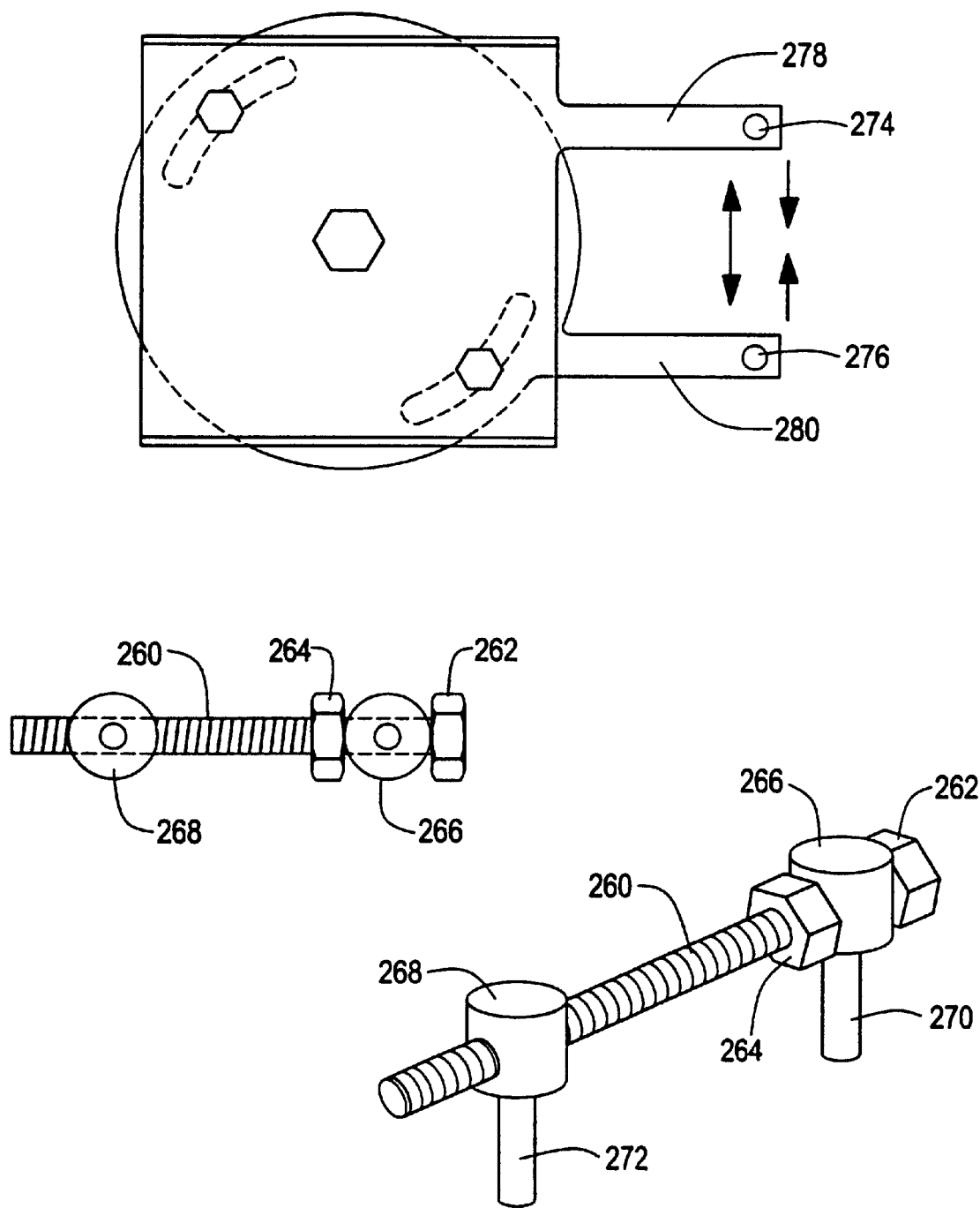
FIG. 8 is a schematic representation showing further details of the azimuth mechanism of FIG. 7.

FIGS. 7–8 in combination with FIG. 3, show an exemplary azimuth positioning mechanism 250 that is controlled by the controller 150. In general, the antenna system 100 is rotated in azimuth about an azimuth axis 252. In one embodiment, the azimuth positioning mechanism 250 includes an upper portion 254 that is rotatable with respect to a lower portion 256 that is fixed in position with respect to the azimuth axis 252 with which a center pivot bolt 258 is concentrically disposed. The lower housing portion 256 includes slots 257a,b into which first and second bolts 259a,b can be inserted through holes in the upper housing portion 254. An azimuth bolt 260 includes first and second nuts 262,264 having a first piece 266 therebetween. A second piece 268 is threadably engaged with an end of the bolt 260. The first and second pieces 266,268 each include legs 270,272 that are insertable within respective holes 274,276 in handles 278,280 of the upper and lower portions 254,256. Rotation of the azimuth bolt increases or decreases the distance between the handles 278,280 depending upon the direction of bolt rotation so as to move the bolts 259a,b within the slots 257a,b in the upper and lower housing portions 254,256. It is to be appreciated that alternate rotation mechanisms can be used to effect azimuth positioning.

In one embodiment, the antenna pointing system is portable so as to be removable from the antenna 102 of a communication system after the antenna 102 is aligned with a satellite. In general, the elevation and azimuth motors 158,160, as well as other components that facilitate automatic positioning of the antenna 102, form a part of the portable antenna pointing system. For example, in the azimuth assembly, in addition to the azimuth motor, the azimuth bolt 260, the first and second nuts 262,264, the first and second pieces 266,268, and the legs 270,272 can be part of a portable antenna pointing system. The handles 278,280 of the upper and lower portions 254,256 of the azimuth assembly can form a part of the antenna assembly. A portable antenna pointing system can include a battery 162 for powering the control unit circuitry, as well as the azimuth and elevation drive assemblies. By limiting movement of the antenna 102 to one axis at a time, the instantaneous power required from the battery is reduced.

Figure 9:
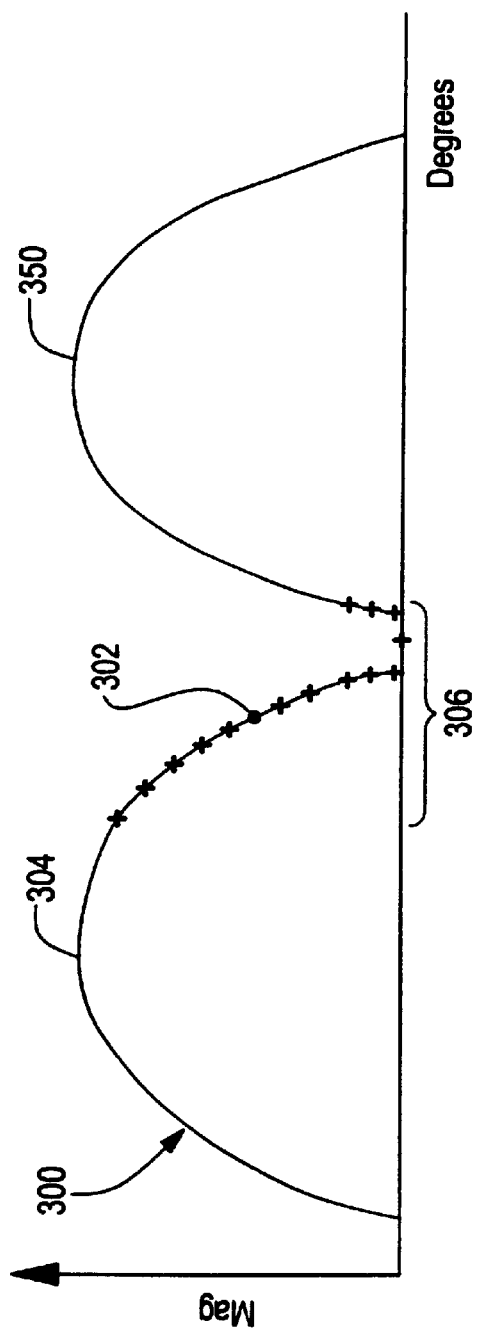
FIG. 9 is a graphical depiction of first and second satellite signals with signal strength points corresponding to first and second satellite signals by an antenna pointing system in accordance with the present invention.

As shown graphically in FIG. 9, the initial position of the antenna 102 should allow reception of a Ku band signal 300 from a desired satellite. In general, the initial antenna position 302 with respect to the first signal 300 will not generally correspond to the signal peak 304 due to atmospheric conditions, random measurement errors and/or other signal interference. The controller 150 then manipulates the antenna 102 across a predetermined elevation (or azimuth) region 306, such as, for example plus/minus two degrees about the peak location.

The predetermined azimuth region should correspond to the satellite spacing proximate the region of interest. For example, in certain regions around the world, such as over Europe, satellites can be displaced by only a few degrees. As demonstrated on the graph in FIG. 9, due to such displacement, an antenna 102 can receive within several degrees, two or more Ku band signals coming from different satellites so displaced. Thus, from a given starting position in which the antenna 102 receives a first signal 300 from a first satellite, movement of one or more degrees in azimuth and/or elevation can result in reception of a second signal 350 from a second satellite adjacent the first satellite. If the signal strength of the second signal 350 is greater than the signal strength of the first signal 300, inaccuracies in determining the peak signal 304 can result. Accordingly, to prevent the power meter 152 from receiving an additional signal strength 350 from a neighboring satellite during a sweep, the predetermined azimuth region 306 is appropriately sized from approximately one to three degrees from a given starting location.

Figure 10:
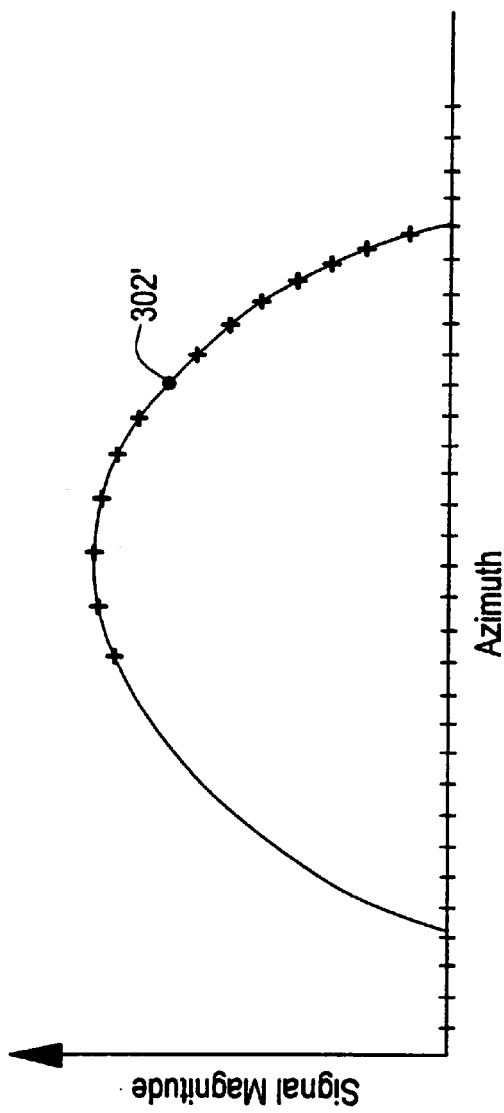
FIG. 10 is a graphical depiction of signal strength points corresponding to the first satellite signal.

During the first pass across the predetermined elevation region 306, the system 100 collects a plurality of signal strength data points, such as, for example, between 500 and 5,000 data points. It is understood, however, that one of ordinary skill in the art can readily select a larger number of data points for a desired level of accuracy. From the collected data points, a new location for the signal peak 302' is selected by the controller 150 as shown in FIG. 10. A wide variety of algorithms can be employed on the stored data points by the controller 150 to determine the true peak signal location. Exemplary algorithms can include the least squares parabola and the so-called average of the 3 dB power level algorithm. It is further understood that other suitable algorithms will be readily apparent to one of ordinary skill in the art.

After selecting the new signal peak location, the system collects signal strength data, such as, for example, between 500 and 5000 data points, across a predetermined azimuth region, such as for example, a region of between one and three degrees plus or minus, about the peak location. A new signal peak location is again selected by the controller 150 based on the collected data points, using an algorithm as provided above.

Over a selected number of iterations, the microcontroller 150 can alternately collect data in azimuth and elevational sweeps to further refine the peak location. In one embodiment, data is collected and the signal peak location is defined three times in both azimuth and elevation. In yet another embodiment, the peak locations obtained from the iterations are compared to determine if the peak locations correspond. If the peak location values do not correspond to each other within a specified fraction of a degree, additional iterations are performed, new peak locations are found and another comparison is yet performed using the new peak locations. It is understood, however, that the number of iterations can vary to achieve a desired level of accuracy. In addition, the number of data points collected across an azimuth and/or elevation level, and size of the azimuth and/or elevation region, may influence the number of iterations.

Figure 11:
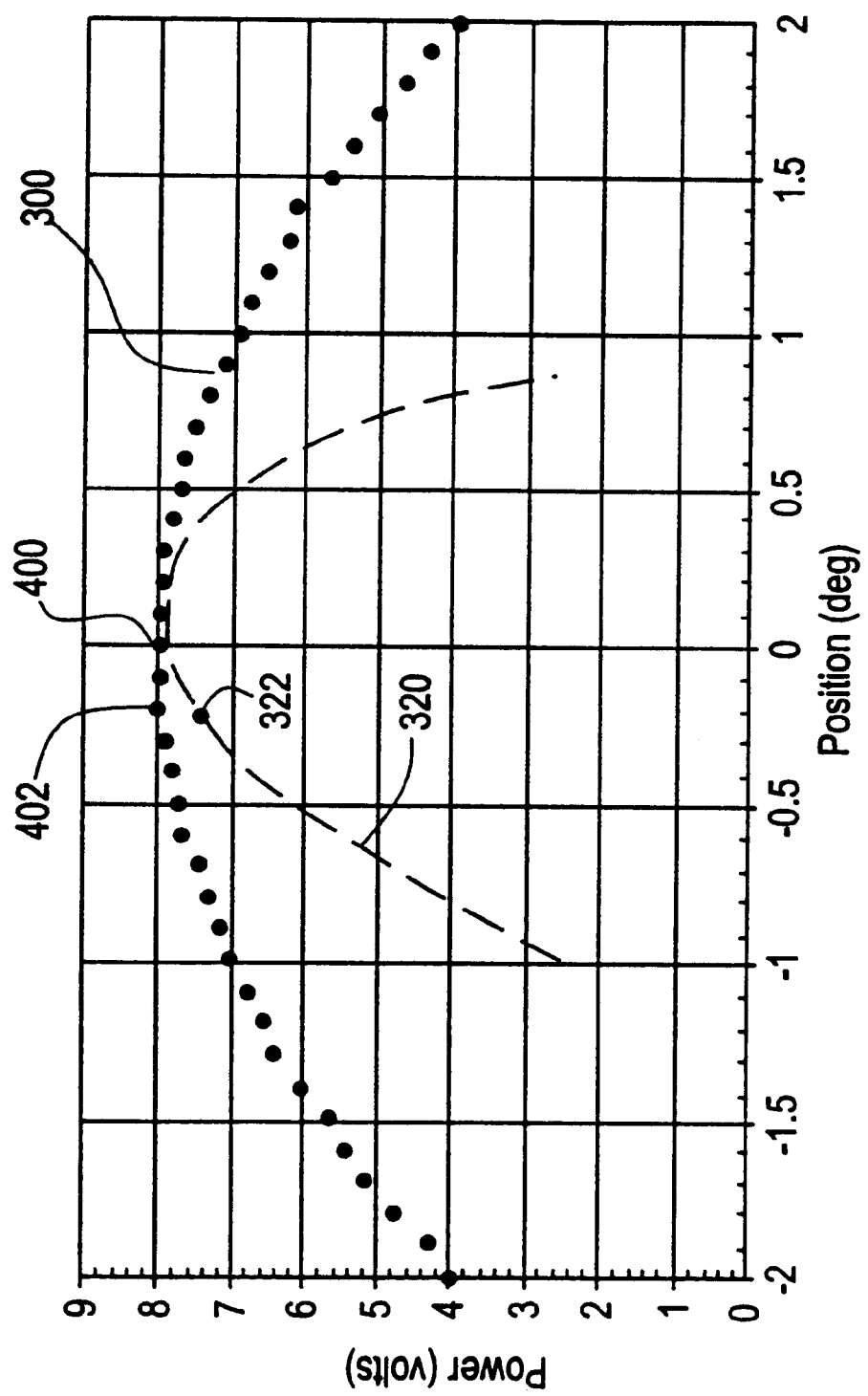
FIG. 11 is a graphical depiction showing a Ku band signal from a satellite with which an antenna pointing systems aligns an antenna and a Ka band signal transmitted by the aligned antenna.

As shown graphically in FIG. 11, the true peak location 400 for the first signal can be selected using, for example, a least squares parabola algorithm. If the highest signal level 402 alone is used to determine the satellite location, it is likely that this data point will be offset to some extent from the true location of the satellite due to atmospheric conditions, random measurement errors and/or other signal interference. And while such an offset may not affect Ku band signal 300 reception, it may seriously degrade Ka band signal 320 transmission by the antenna system to the satellite. As shown by data point 322, which corresponds to the position of the antenna 102 at the incorrect peak location, that is, at the highest signal Ku signal level 402, the Ka signal has a strength of about 0.5 volts less than the strength it has at the true peak location 400.

In another embodiment, the antenna 102 can be appropriately moved to minimize vibrational or mechanical backlash, that is, mechanical irregularities that decrease the accuracy of the antenna position information. When performing a scan using a low cost commercial antenna, mechanical backlash can cause significant position errors at the Ka band. One source of backlash is in dead spots in the screws used to move the antenna 102 in azimuth/elevation. As discussed above, after the antenna positioning system performs a scan, it causes the antenna 102 to move to a new peak location. Mechanical backlash can be eliminated by performing such movement in the same direction as the previous scan. As described in the example below, movement of the antenna 102 in the same direction of the previous scan can be effectively accomplished by extending the scan beyond the predetermined azimuth or elevation region and returning to a boundary area of the region across which data is to be collected.

For example, to perform a 2 degree left to right azimuth scan about a recently obtained peak location, the system would first move to minus 3 degrees from the peak location, then move to minus 2 degrees, and then begin the scan to terminate at plus 2 degrees. After a new peak location is determined, such as for example, minus 0.12 degrees, to move to such location, the system would move from the current plus 2 degree position to minus 3 degrees, and then from minus 3 degrees to minus 0.12 degrees. If the system moved directly from plus 2 degrees to minus 0.12 degrees, it is possible that significant backlash error would be introduced.

Figure 12:
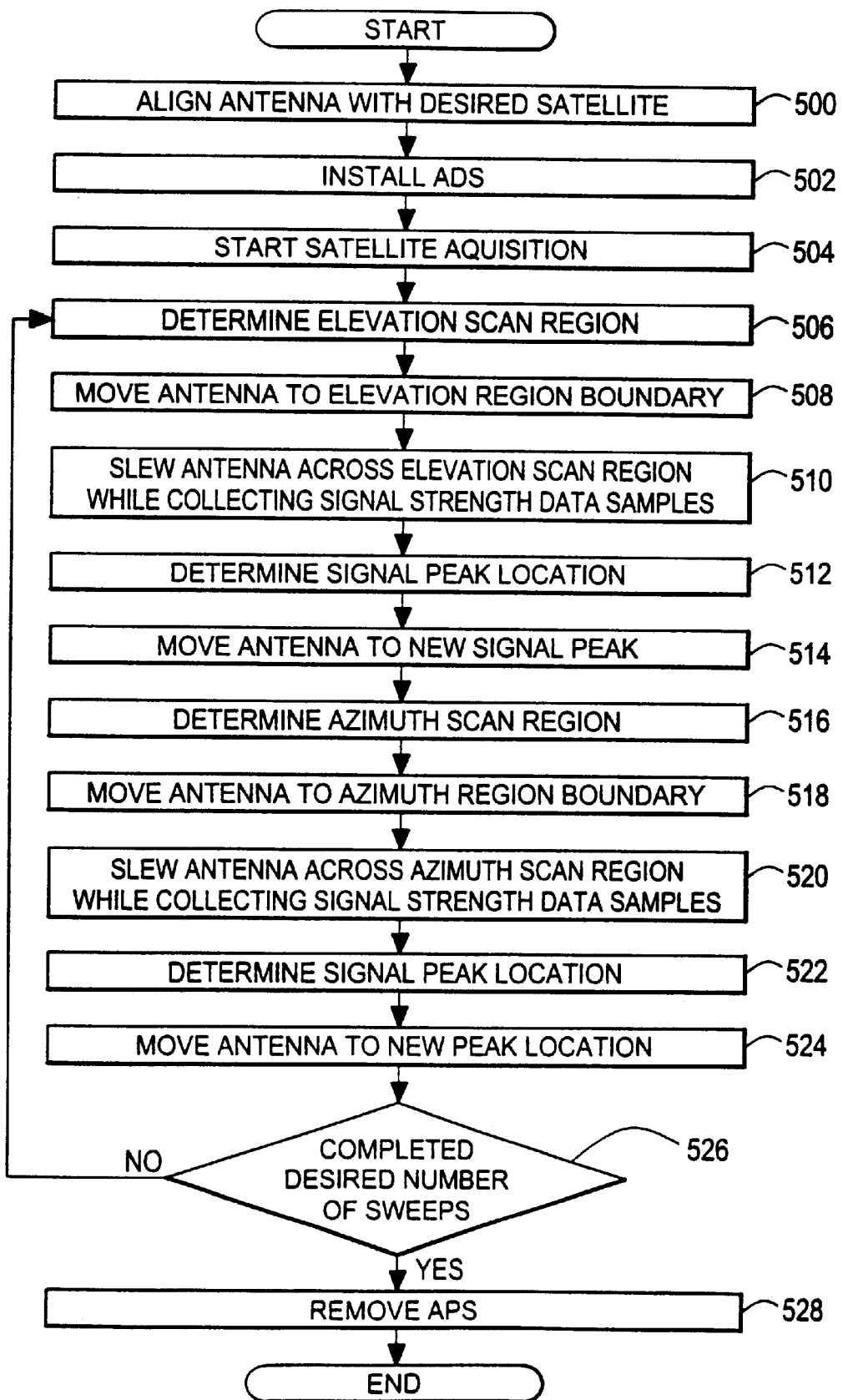
FIG. 12 is a flow diagram showing an exemplary sequence of steps for aligning an antenna with a satellite signal in accordance with the present invention.

FIG. 12, in combination with FIGS. 1 and 3, show an exemplary sequence of steps in accordance with the present invention for positioning the antenna system. In step 500, a satellite communication antenna 102 aligned with a desired satellite such that the Ku band signal, for example, is received. The antenna 102 can be manipulated manually until the proper signal is received. The antenna pointing system 100 is then installed onto the antenna 102 with the data cable 120 from the feed 106 being coupled to the system control unit 114. In step 504, satellite acquisition is initiated.

In step 506, an elevation scan region, such as plus/minus two degrees, is determined, and in step 508 the antenna 102 is moved to a boundary of the elevation scan region. The antenna 102 then slews across the scan region, e.g., four degrees, collecting signal strength data samples in step 510. In one embodiment, the antenna 102 slews at one degree per second and collects five hundred samples $(x, p_x)$ per second (e.g., 2000 samples total) using the RF power meter 152. Based upon the collected data samples, a new signal strength peak location is determined from the generally parabolic shape of the collected data in step 512. In step 514, the antenna 102 is moved to the new peak location. Prior to moving to the new peak location, the antenna 102 can optionally be moved back across the scanned elevation region and to the initial starting point to minimize backlash.

In step 516, the system determines an azimuth scan region, e.g., plus/minus two degrees, and in step 518, the antenna 102 is moved to the scan region boundary. The antenna 102 then slews across the azimuth scan region collecting signal strength data in step 520. In step 522, a new peak signal location is determined from the collected azimuth data. In step 524, the antenna 102 is moved to the new peak location. It is understood that the antenna 102 can be moved to the azimuth scan boundary to minimize backlash effects and to move the antenna 102 in a consistent direction over multiple iterations.

In step 526, it is determined whether the desired amount of elevation and azimuth data scans have been completed. This can be accomplished by, for example, determining if a certain predetermined number of scans X have been performed, or by comparing the peak signal locations obtained from the scans to determine whether a number of the peak signal locations match. If additional scans are needed, such as if the predetermined number X has not been reached, or if no match is found among the peak signal locations received; a further elevation scan region is determined in step 506. In addition, the scan region and slewing speed can be reduced in further iterations. In one embodiment, a second elevation or azimuth sweep corresponds to plus/minus one degree with the antenna 102 slewing at 0.5 degree per second at five hundred samples per second. A further azimuth sweep can also be performed in step 520 until the desired number of sweep iterations is completed, or the obtained peak signal locations match. The antenna pointing system is then removed from the antenna 102 in step 528.

Figure 13:
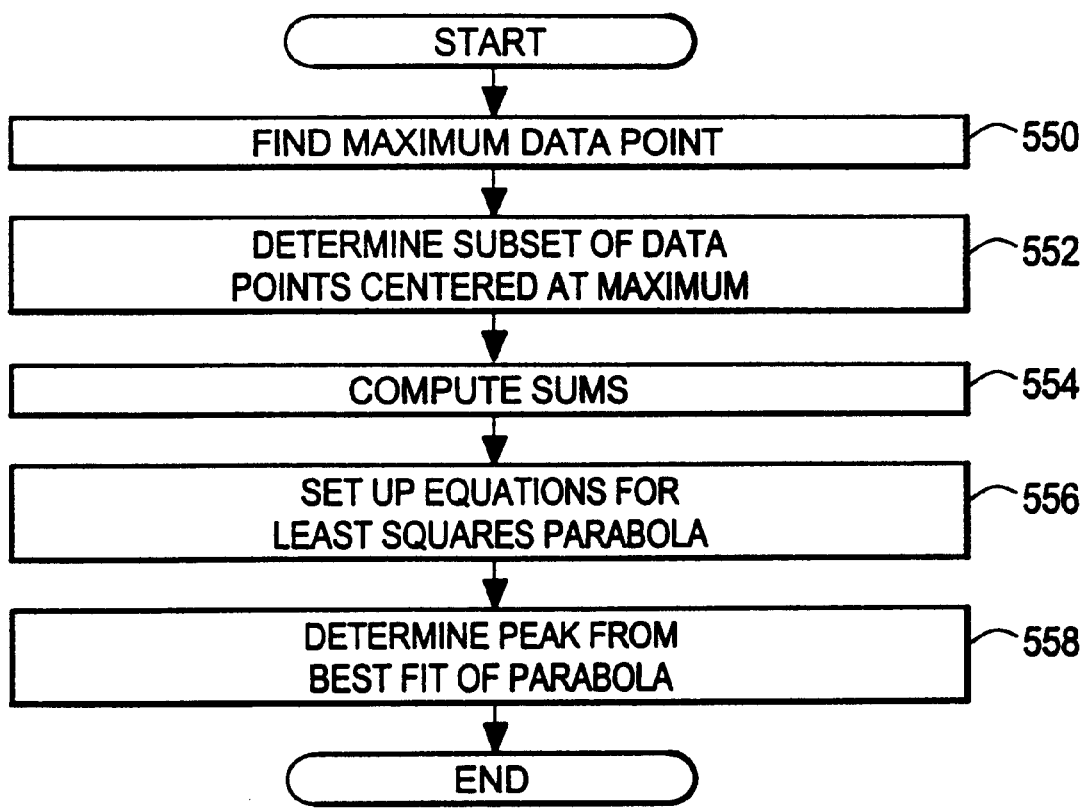
FIG. 13 is a flow diagram showing an exemplary sequence of steps for determining the location of a signal peak of the satellite signal.

FIG. 13 shows an exemplary implementation that can be executed by the controller 150 for determining the signal peak location based upon a least squares parabola algorithm, which can correspond to step 512 in FIG. 12. The controller 150 can be programmed in any number of languages, such as, for example, GALIL, FORTRAN, or machine language.

From the collected signal strength points $(x, p_x)$, where x is the location (angle) and $p_x$ is the power level, the controller 150 determines the maximum power value in step 550. By taking the maximum value, aligning the antenna 102 with an adjacent satellite, as discussed above in FIG. 9, is prevented. In step 552, a subset of the data centered about the maximum power value is determined. In one embodiment, the subset comprises the two hundred and fifty points before and after the maximum value $X_{max-250}$, $P_{xmax-250}$ to $x_{max+250}$, $p_{xmax+250}$) from the two thousand total signal strength points.

In step 554, sums are set up for the least squares parabola fit for the subset of 501 data points. In one embodiment, the following sums are computed:

$$z_0 = 501 \qquad w_1 = \sum_{i=1}^{501} p_{x_i}$$

$$z_1 = \sum_{i=1}^{501} x_i \qquad w_2 = \sum_{i=1}^{501} x_i p_{x_i}$$

$$z_2 = \sum_{i=1}^{501} x_i^2 \qquad w_3 = \sum_{i=1}^{501} x_i^2 p_{x_i}$$

$$z_3 = \sum_{i=1}^{501} x_i^3$$

$$z_4 = \sum_{i=1}^{501} x_i^4$$

From the computed sums, three equations are set up in step 556.

$$w_1 = a_1 z_0 + a_2 z_1 + a_3 z_2$$

$$w_2 = a_1 z_1 + a_2 z_2 + a_3 z_3$$

$$w_3 = a_1 z_2 + a_2 z_3 + a_3 z_4$$

In step 558, the peak is determined from the best fit parabola. More particularly, the above equations are solved for $a_1, a_2$, and $a_3$. For example, $$a_3 = \frac{\left[\dfrac{z_1 w_1 - z_0 w_2}{z_1^2 - z_0 z_2} - \dfrac{z_2 w_1 - z_0 w_3}{z_1 z_2 - z_0 z_3}\right]}{\left[\dfrac{z_1 z_2 - z_0 z_3}{z_1^2 - z_0 z_2} - \dfrac{z_2^2 - z_0 z_4}{z_1 z_2 - z_0 z_3}\right]}.$$

The best fit parabola is defined by $p(x) = a_1 + a_2 x + a_3 x^2$ such that the peak occurs at $$x = -\frac{a_2}{2a_3}.$$

Thus each pass further refines the signal peak location. For each pass, the number of data points used in the calculation and/or the number of samples per degree can be increased. One of ordinary skill in the art will readily appreciate that the least squares parabola technique, which is relatively efficient, can be readily replaced with other suitable algorithms.

The antenna positioning system of the present invention automatically positions the antenna 102 using a first signal, e.g., a Ku band signal, with sufficient accuracy for transmission of a second signal, e.g., a Ka band signal, having a higher frequency than the first signal. The system positions the antenna 102 using the Ku band signal, which has a relatively wide bandwidth, and optimizes Ka band transmission, which has a relatively narrow bandwidth. This arrangement allows rapid and accurate positioning of the antenna 102 for optimal receive and transmit operation.

It is understood that the overall dimensions of the antenna 102 can vary in accordance with the requirements of a particular application. An exemplary range for an antenna 102 that can be pointed in accordance with the present invention is from about seventy-five to about one hundred and five centimeters in diameter. In one embodiment, a Ku/Ka communication system, such as that described herein, can include a Gregorian antenna having a main reflector or dish with a diameter of about ninety-five centimeters.

One skilled in the art will appreciate further features and advantages of the invention based on the above-described embodiments. Variations and modifications may be made to the invention, with attainment of some or all of the advantages of the invention. Therefore, it is the object of the appended claims to cover all such variations and modifications as come within the true spirit and scope of the present invention.

What is claimed is:

1. An antenna pointing system for aligning an antenna with a geo-synchronous satellite, comprising:
a control unit matable to the antenna, the control unit including a controller and a power meter, the power meter being connectable to a feed horn to obtain signal strength data for a first signal having a first frequency transmitted by a satellite;
a housing matable to the antenna, the housing including an azimuth drive assembly coupled to the control unit for azimuth positioning of the antenna; and
an elevation drive assembly coupled to the control unit for elevation positioning of the antenna,
wherein the controller positions the antenna in azimuth and elevation with sufficient accuracy for transmitting a second signal having a second frequency to be received by the satellite, the second frequency being higher than the first frequency.

2. The system according to claim 1, wherein the first signal corresponds to the Ku band.

3. The system according to claim 2, wherein the second signal corresponds to the Ka band.

4. The system according to claim 1, wherein the antenna includes a subreflector and a main reflector.

5. The system according to claim 4, wherein the main reflector has a diameter of about 95 centimeters.

6. The system according to claim 1, further including a battery for energizing the antenna pointing system.

7. The system according to claim 1, wherein the antenna pointing system is removable from the antenna.

8. The system according to claim 1, wherein the control unit includes a storage element for storing signal strength data.

9. A method for aligning an antenna with a satellite, comprising:
(a) pointing the antenna at the satellite such that the antenna receives a first signal having a first frequency;
(b) obtaining a first plurality of first signal strength data points over a predetermined azimuth region;
(c) determining a first peak signal location based on the first plurality of first signal strength data points;
(d) obtaining a second plurality of first signal strength data points over a predetermined elevation region;
(e) determining a second peak signal location based upon the second plurality of first signal strength data points;
(f) repeating (b)–(e) a predetermined number of times such that the antenna is aligned with the satellite with sufficient accuracy for transmission of a second signal having a second frequency having a bandwidth that is significantly narrower than a bandwidth of the first signal.

10. The method according to claim 9, wherein the first signal corresponds to a Ku band signal.

11. The method according to claim 9, wherein the second signal corresponds to a Ka band signal.

12. The method according to claim 9, wherein the predetermined azimuth region is about plus/minus two degrees.

13. The method according to claim 9, wherein determining the first peak signal location further includes using a least squares parabola peak detection algorithm.

14. The method according to claim 9, wherein the first plurality of first data points can include from about ten to about one hundred thousand signal strength measurements.

15. The method according to claim 9, wherein determining the peak signal location includes using a least squares parabola algorithm.

16. An antenna pointing system for aligning an antenna with a geo-synchronous satellite, comprising:
a control unit including
a power meter for providing signal strength data;
a controller coupled to the power meter for receiving the signal strength data;
an azimuth amplifier for receiving azimuth position commands from the controller and providing an azimuth motor control signal;
an elevation amplifier for receiving elevation position commands from the controller and providing an elevation motor control signal;
a housing including
an azimuth drive assembly for positioning the antenna in azimuth, the azimuth drive assembly including an azimuth encoder and a azimuth motor, the azimuth encoder providing antenna azimuth position information to the controller, the azimuth motor for receiving the azimuth motor control signal from the controller and manipulating the antenna about an azimuth axis; and
an elevation drive assembly for positioning the antenna in elevation, the elevation drive assembly including an elevation encoder and an elevation motor, the elevation encoder providing antenna elevation position information to the controller, the elevation motor for receiving the elevation motor control signal from the controller and manipulating the antenna about an elevation axis,
wherein the controller positions the antenna in azimuth and elevation from Ku signal strength data points across predetermined azimuth and elevation regions with sufficient accuracy for transmission of a second signal corresponding to the Ka band to the satellite.

17. The system according to claim 16, further including a battery for energizing the control unit and the azimuth and elevation drive assemblies.

18. The system according to claim 16, wherein the antenna pointing system is portable with the control unit and the housing being removable from the antenna.

* * * * *